United States Patent [19]
Schlereth et al.
[11] 4,221,964
[45] Sep. 9, 1980

[54] CONTROL SYSTEM FOR MASS SPECTROMETER

[75] Inventors: Fritz H. Schlereth, Baldwinsville; Gary E. Lanpher, Minoa, both of N.Y.
[73] Assignee: Inficon Leybold-Heraeus Inc., East Syracuse, N.Y.

[21] Appl. No.: 11,096
[22] Filed: Feb. 12, 1979
[51] Int. Cl.[2] .............................................. B01D 59/44
[52] U.S. Cl. ...................................... 250/290; 250/295
[58] Field of Search ................................ 250/290, 295

[56] References Cited

U.S. PATENT DOCUMENTS 3,410,998 11/1968 Watters ................................ 250/290
3,413,463 11/1968 Brubaker .............................. 250/290
3,457,404 7/1969 Uthe ...................................... 250/290
3,920,986 11/1975 Fies ...................................... 250/290

*Primary Examiner*—Harold A. Dixon
*Attorney, Agent, or Firm*—Bruns & Jenney

[57] ABSTRACT

An RF control system suitable for use in a mass spectrometer of the type having an ionization chamber, a mass filter and an ion detector. A constant frequency RF voltage is applied to the filter. The magnitude of the RF signal is varied in response to a DC control signal to permit selected ions having a desired charge-to-mass ratio to pass through the filter and strike the detector. In the control system the generated RF signal is attenuated and added to the DC control signal. The resultant voltage is applied to a comparator-integrator circuit that is arranged to provide a control signal capable of precisely holding the output of the RF generator at a predetermined peak voltage.

11 Claims, 3 Drawing Figures

CONTROL SYSTEM FOR MASS SPECTROMETER

BACKGROUND OF THE INVENTION

This invention relates to a mass spectrometer and, in particular, to a control system for use in a mass spectrometer for precisely maintaining the peak RF voltage applied to the spectrometer mass filter at a desired operating level.

Mass spectrometers are employed to measure atomic masses contained within a given substance. The spectrometer conventionally contains three basic sections including an ionization chamber, a mass filter and an ion detector. A gas or vapor of the sample to be analyzed is introduced into the ionization chamber where it is bombarded with electrons causing the sample gas to become ionized. The ions are drawn into the filter which is electrically tuned to pass only those ions having a selected charge-to-mass ratio therethrough. At the detector the selected ions are collected and a signal is generated that is indicative of the density or number of selected ions present. Usually the detector output is displayed upon a video screen or oscilloscope to provide a direct visual read out of the detected ion data.

In operation, the magnitude of the RF voltage applied to the filter is periodically changed so that ions of differing charge-to-mass ratios can be individually analyzed by the equipment. The peak RF voltage is typically changed in response to the level of a DC control signal provided by the spectrometer controller. By looking at a relatively wide spectrum of masses, the make-up of the sample can be determined. It is very important in the operation of the mass spectrometer therefore that the peak voltage produced by the RF generator be accurately and repeatably maintained over a wide dynamic operating range. In general, filter control systems used in many prior art devices fail to deliver the stability needed to meet the demand placed on today's equipment; exhibit relatively slow response times and cannot provide a linear response over a wide spectrum of atomic masses.

It should be further noted that in many prior art devices vacuum tube circuits are employed extensively to both measure the peak RF voltage applied to the filer and also to power various electrical components used in the instrument. Because of the nature of most vacuum tube circuits, the linear accuracy required of a precision mass spectrometer cannot be held over a wide operating range. Furthermore, vacuum tubes are generally energy consuming and devices do not possess the reliability of solid state components.

SUMMARY OF THE INVENTION

It is therefore an object of the present invention to improve mass spectrometers.

A further object of the present invention is to provide an improved control system for use in conjunction with the filter of a mass spectrometer.

Another object of the present invention is to improve the linear response of a mass spectrometer over a relatively wide operating range.

Yet another object of the present invention is to provide a means for controlling the RF generator of a mass spectrometer to provide an extremely stable generator output and a very rapid response time.

A still further object of the present invention is to eliminate the need for vacuum tubes in the filter control circuit of a mass spectrometer.

Still another object of the present invention is to simplify control means for accurately and repeatably maintaining the peak RF voltage applied to a mass spectrometer filter at a precise operating level.

These and other objects of the present invention are attained by means of a filter control system used in a mass spectrometer of the type having an ionization chamber, a mass filter and an ion detector wherein the control system is employed to accurately set the magnitude of an RF signal applied to the filter of the instrument. In practice, the output of the system's RF generator is sampled, attenuated and added to a DC signal provided by the instrument's controller and the resultant signal is applied to a comparator-integrator circuit that is arranged to produce a feedback signal capable of maintaining the amplitude of the RF generator output at a precise operating level.

BRIEF DESCRIPTION OF THE DRAWINGS

For a better understanding of these and further objects of the present invention reference is had to the following detailed description of the invention which is to be read in conjunction with the accompanying drawings, wherein.

DESCRIPTION OF THE INVENTION

The present invention involves an electrical feedback system for maintaining the peak amplitude of an RF generator at a precise peak amplitude. The system is particularly well-suited for use in controlling the RF voltage signal applied to the filter of a mass spectrometer. From the disclosure below it should be evident to one skilled in the art that the present system can be employed to control the voltage applied to either a monopole or a guadrupole mass filter of any suitable design or configuration known and used in the art. In the mass spectrometer, a gas or vapor of a sample to be analyzed is ionized and the ion then directed through a filter. The filter is "tunable" so that particles having the same charge-to-mass ratio, or more simply "mass", are focussed upon a detector to provide a mass spectrum from which the atomic make-up of the sample may be deduced.

In a quadrupole mass spectrometer the filter may consist of four elongated electrodes that are equally spaced about the axis of the instrument. A voltage control signal is applied to each of the electrodes to establish a control field within the filter zone. The control signal can be varied so that ions having different mass ratios may be selectively passed through the filter. The control signal consists of a DC voltage component (U) and a high frequency voltage component (V) which is usually in the RF range. As noted, in order to analyze a sample gas, the filter must be selectively tuned over the range of the mass spectrum. One means of selectively tuning the mass filter is to vary both the DC signal level and the peak RF signal level while at the same time holding the U/V ratio equal to some constant value at which the response of the system is linear.

Figure 2:
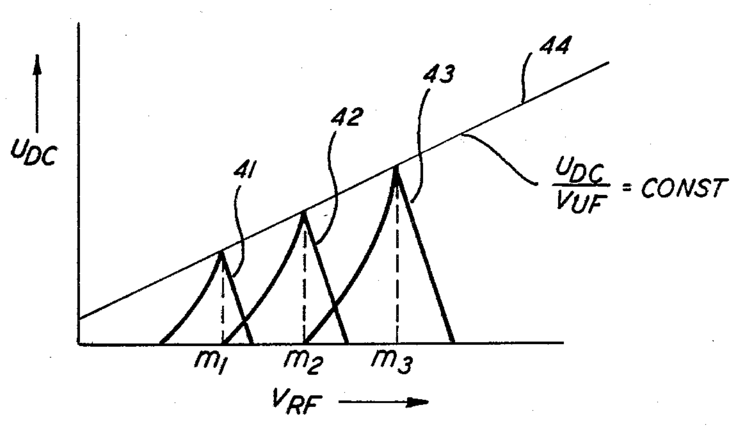
FIG. 2 is a graphic representation illustrating a group of constant sensitivity curves for a mass spectrometer that is capable of analyzing atomic masses over a wide spectrum wherein the peak RF voltage applied to the filter of the instrument is plotted along the abscissa and the level of DC voltage applied to the filter is plotted along the ordinate.

An ideal linear response curve for a mass spectrometer is shown plotted in FIG. 2 upon U-V plane. As illustrated the $U_{dc}$ ordinate represents the DC voltage applied to the filter and the $V_{rf}$ abscissa represents the pak RF voltage applied thereto. The response curve 44 is developed from a series of constant sensitivity curves, such as curves 41–43, that, in practive, extend across the mass spectrum. Each sensitivity curve is generally triangular in shape with its base lying upon the abscissa and its apex being defined by a set of coordinates in the U-V plane. The region within each sensitivity curve represents a range of values for which a particular ion having a specific charge-to-mass ratio will be able to maintain stable oscillations within the filter control field and thus be passed through the filter on to the detector. The apex of each sensitivity curve is represented by values $m_1$, $m_2$ and $m_3$ in FIG. 2. As graphically illustrated, the peaks of the sensitivity curves form a locus of points which describes a linear response curve over the range of the mass spectrum.

As can be seen from the response curve illustrated in FIG. 2, to accurately tune the filter to pass a selected ion mass, a DC voltage and a peak RF voltage satisfying the appropriate set of coordinates in the U-V plane must be applied to the filter. The DC voltage (U), as well as the peak RF voltage (V), applied to the filter are both regulated in response to the voltage level of a master DC signal provided by the controller 13 (FIG. 1) of the instrument. In practice, the level of the master signal is increased linearly in proportion to the response characteristics of the instrument. Using present state of the art equipment, the DC voltage (U) applied to the filter can be accurately generated for a given mass number, thereby satisfying one of the two filter voltages. It has been found relatively more difficult to repeatably and accurately produce the required peak RF signal because of the relatively unstable response of most RF generators over the range of the mass spectrum.

Figure 1:
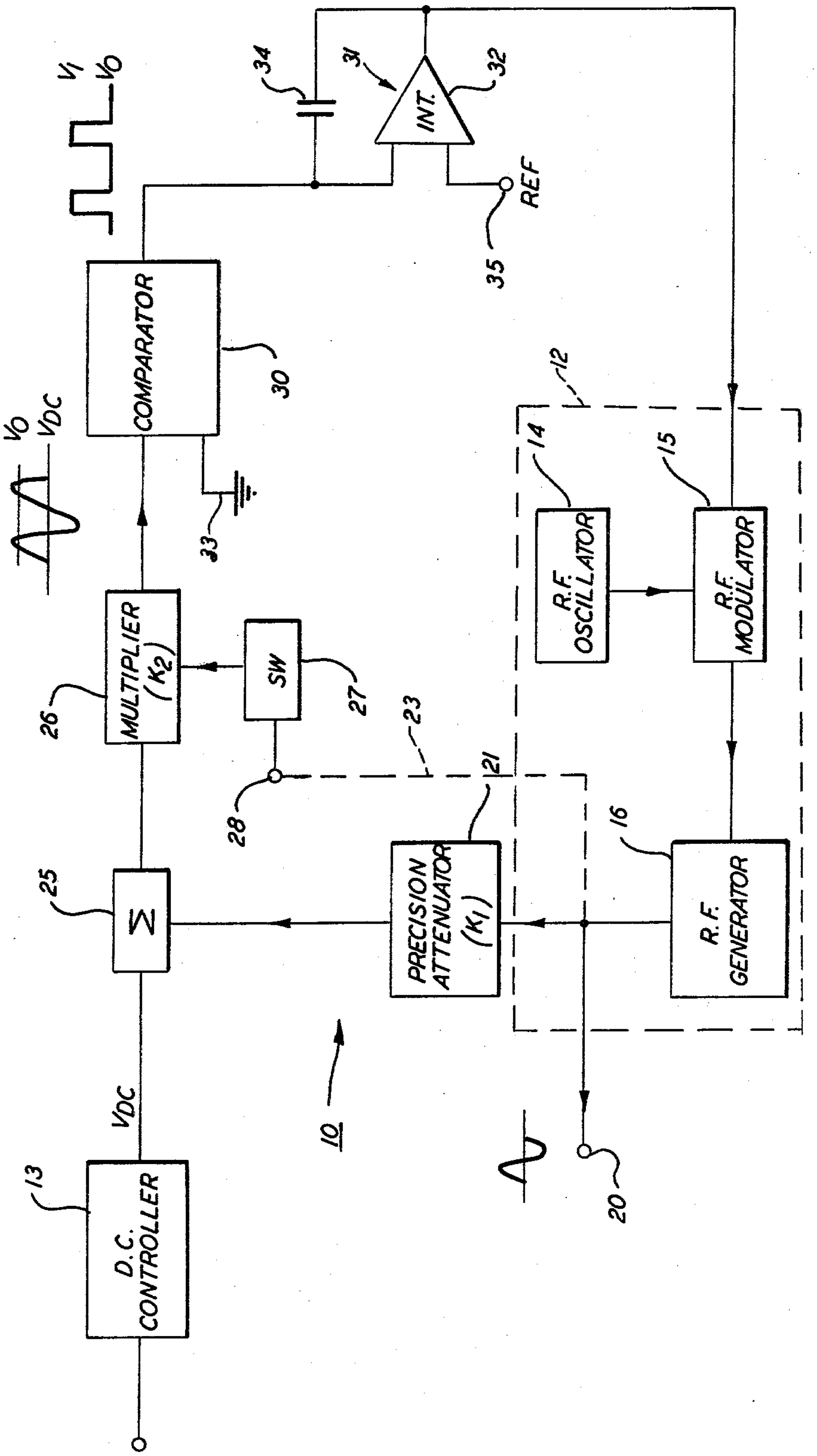
FIG. 1 is a block diagram illustrating an electrical control circuit embodying the teachings of the present invention for maintaining the RF control signal applied to the filter of a mass spectrometer at a precise operating level.

Referring now to FIG. 1, there is shown a control system, generally referenced 10, that is capable of precisely maintaining the peak RF output of a generator at a desired operating point along the linear response curve of the instrument. It should be noted at this point that all component parts used in the present system are of solid state construction and, as such, provide a high degree of dependability while at the same time consuming little energy. The RF section 12 of the system includes an oscillator 14, a modulator 15 and a RF output generator 16. The oscillator may be of any suitable construction, such as a quartz crystal or the like, capable of developing oscillations of a desired frequency. The oscillator signal is fed through a modulator 15, which is arranged to vary the amplitude of the signal, put out by the generator 16. The output voltage signal of the generator, in turn, is applied to one of the electrodes of the mass spectrometer filter at terminal 20 to provide the required high frequency component (V).

The control system of the present invention is basically a feedback loop for holding the peak amplitude of a generated RF signal at a precise level for each selected filter setting. Initially, a sample of the RF generator output signal is passed through an attenuator circuit 21, and the signal is reduced by a factor $K_1$ whereby the attenuated voltage can be expressed by the relationship $$V_{rf}=K_1 V_p \sin \theta \qquad (1)$$

wherein $V_p$ is the peak voltage of the generator output signal and $\theta$ is phase angle of the signal. The attenuated voltage is then delivered to an adder 25 where it is summed with the master DC signal provided by the controller 13. This, in effect, causes the sinusoidal RF signal to ride a bias provided, by the controller output signal. Accordingly, the resultant voltage signal is expressed by the following relationship:

$$V_c=V_{dc}+K_1 V_p \sin \theta \qquad (2)$$

where $V_{dc}$ is the controller output signal.

The resultant voltage is passed through a multiplier circuit 26 and applied to the signal input terminal of a comparitor circuit 30. In operation, the multiplier is arranged to change the resultant voltage by some factor $K_2$ in response to a control signal provided by switching circuit 27, the operation of which will be explained in further detail below. The signal applied to the comparator is now equal to $$V_c=K_2(V_{dc}+K_1 V_p \sin \theta) \qquad (3)$$

As can be seen, the multiplier factor is applied to both the AC and DC components of the resultant signal.

The comparator circuit operates in conjunction with an integrator circuit 31 to provide a control voltage for setting the output of the RF generator at a precise level that is proportional to the magnitude of the DC controller signal. As shown, the threshold of the comparator is set to a ground potential at 33. The comparator thus produces a zero output whenever the signal input to the comparator is less than zero. When the input signal is equal to zero the comparator will change state and provide a non-zero output.

Figure 3:
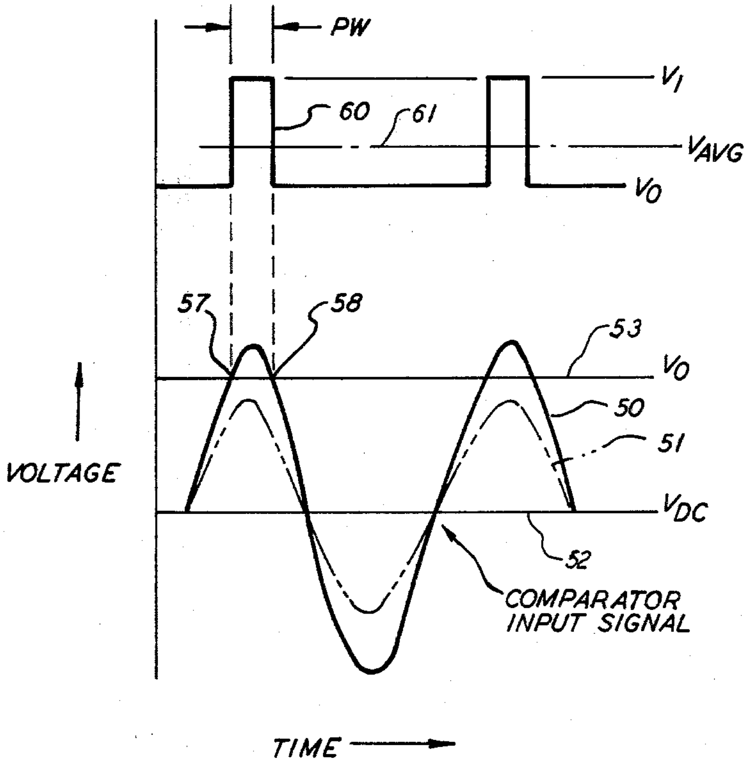
FIG. 3 is a diagram comparing the input signal to the output signal of the comparator circuit used in the control system of FIG. 1.

The input signal to the comparator is graphically illustrated in FIG. 3 by the curve shown in the lower portion of the diagram. The attenuated RF signal 50 is shown riding the $V_{dc}$ bias signal 52 provided by the controller. Depending upon the bias level, the RF signal will cross the comparator threshold level 53 at point 57 when the signal is increasing in the first quadrant and at point 58 as it is decreasing in the second quadrant of the cycle. The comparator thus will change state when the following relationship is met:

$$V_c=O=K_2(V_{dc}+K_1 V_p \sin \theta) \qquad (4)$$

Solving for equation (3) in terms of peak voltage:

$$V_p=(-)\ V_{dc}/K_1 \sin \theta \qquad (5)$$

It should be noted that the multiplier factor drops out of the equation and that the peak voltage is expressed in known terms.

Referring once again to FIG. 3, the output of the comparator circuit is shown in timed relationship with the incoming signal. As can be seen, each time the input signal crosses the threshold voltage 53, the comparator changes state between $V_0$ and $V_1$. A non-zero output condition will remain for a fixed period of time that is proportional to the phase angle 0.

The output of the comparator is applied to an integrator circuit 31 made up of an operational amplifier 32 and a capacitive feedback loop 34. The integrator is arranged to generate an output control voltage, which is applied to the RF modulator, which will set the peak amplitude precisely at the required level. In the system, the phase angle $\theta$ is determined by the magnitude of the reference voltage applied to the integrator at reference input 35. Under steady state conditions, the average voltage 61 (FIG. 3) at the output of the comparator must be equal to the reference voltage. Thus:

$$\theta = 2\pi V_r / V_p$$

where $V_r$ is the integrator reference voltage. As can be seen, $\theta$ is a constant, as is $K_1$, so that according to equation (5) above, the peak amplitude of the RF signal must be proportional to the level of the controller signal.

In the event the peak of the RF signal fails to cross the threshold of the comparator, as depicted by the curve 51 in FIG. 3, the average output of the comparator will fall off. This in turn causes the output of the integrator to increase thereby increasing the magnitude of the RF signal. This condition will exist until the steady state average voltage of the comparator once again equals the integrator reference voltage. Correspondingly, if the peak of the RF generator drifts upwardly, the average output of the comparator will increase thus causing the output of the integrator to fall off. Here again, the output of the generator will be compensated for until the desired steady state conditions are again established.

With the above-noted control system in mind, it can be seen that without a multiplier factor $K_2$, the range of variations of signals applied to the comparator would be of the same magnitude as the output of the RF generator. This, of course, could place severe restrictions upon the comparator circuit if left uncorrected. In the present arrangement, the multiplier factor is applied after the RF voltage is added to the DC voltage and, as noted, drops out of the peak RF voltage equation (5). This makes it possible to alter the comparator input signal within the operating range of the device without affecting the signal feedback to the RF modulator.

Referring back to FIG. 1, the multiplier is arranged to provide a factor of one to the comparitor input signal when the RF output is within the comparator operating range. When the input signal falls out of the range, switch 27 becomes operative to charge the multiplier factor and thus bring the input signal back within desired operating limits. In practice, the switch 27 may be a diode rectifier that is connected to the output of RF generator as indicated by dotted line 23 in FIG. 1. The diode is arranged to provide a measure of the RF output signal and is adapted to change the multiplier factor in the event the RF moves outside of the comparator range. Other system parameters, such as the DC master signal, could also be used to provide the switching function.

While this invention has been described with reference to the structure disclosed above, it is not necessarily confined to the structure as set forth and this invention covers any modifications or changes that may come within the scope of the following claims.

We claim:

1. In a tunable control filter for use in a mass spectrometer of the type wherein an alternating voltage having a fixed frequency is applied to at least one electrode of the filter and the amplitude of the alternating signal is varied in response to the level of a master DC voltage signal provided by the spectrometer controller, the improvement comprising a frequency generator for providing an alternating voltage to the filter which is at a fixed frequency, a modulator for regulating the amplitude of the generator output signal in response to a gain control signal, attenuator means for sampling the output of said generator and providing an attenuated voltage output in response thereto, adder means for summing the attenuated voltage output and the DC master signal voltage to provide a resultant voltage signal wherein the attenuated voltage is riding the variable DC master signal voltage, comparator means in series with said adder for setting the resultant output signal voltage equal to a fixed threshold voltage and producing an output pulse when the resultant voltage is equal to or greater than the threshold voltage whereby the time duration of the pulse is a measure of the peak amplitude of the generator output voltage, and integrator means for receiving the output pulses of said comparator means and providing a gain control signal in response to said pulses that is applied to the modulator for maintaining the peak amplitude of the generator at a precise level that is proportional to the DC master signal.

2. The improvement of claim 1 wherein the threshold voltage of the comparator means is set at a ground potential and the comparator means is arranged to change state from a zero to a non-zero output when the attenuated signal riding the variable DC bias is equal to or greater than the threshold potential.

3. The improvement of claim 2 wherein said integrator means includes an operational amplifier, capacitor feedback means and a reference voltage means for establishing a gain control signal for modifying the amplitude of the generator output signal so that the attenuated signal component applied to the comparator means is brought into equilibrium with the reference voltage.

4. The improvement of claim 3 further including a multiplier for changing both the DC component and the alternating component of the resultant signal applied to the comparator means by a common factor.

5. The improvement of claim 4 which further includes a switch means for changing the common factor of the multiplier.

6. The improvement of claim 5 wherein the switch means is responsive to the amplitude of the alternating voltage produced by the generator.

7. The improvement of claim 5 wherein said switch means is responsive to the level of the DC master signal.

8. The method of controlling the peak amplitude of an alternating voltage signal that is applied to the filter of a mass spectrometer including the steps of sampling the alternating voltage applied to the filter, adding the sampled alternating voltage to a variable DC control signal that is used to tune the filter, setting the added voltage equal to a fixed threshold voltage, generating an output pulse when the added voltage is equal to or exceeds the threshold voltage whereby the time duration of the pulse is a measure of the peak amplitude of the alternating signal, comparing the output pulse with a predetermined standard at which the peak amplitude of the alternating voltage signal is precisely set in proportion to the DC signal, and adjusting the amplitude of the alternating voltage signal when said output pulse is unequal to said standard in order to equalize the two.

9. The method of claim 8 further including the step of averaging the pulse signals and comparing the average voltage with a predetermined reference voltage at which said peak amplitude of the alternating voltage signal is precisely set in proportion to the DC signal.

10. The method of claim 8 further including the step of attenuating the sampled voltage prior to adding it to the DC control signal.

11. The method of claim 8 further including the step of multiplying both the DC control signal and the sampled voltage signal to change each voltage by the same factor prior to setting the resultant voltage equal to the threshold voltage.

* * * * *